(12) United States Patent
Bessard

(10) Patent No.: US 11,325,793 B2
(45) Date of Patent: May 10, 2022

(54) STAR WHEEL FOR A ROTARY PACKING MACHINE

(71) Applicant: PACK'R, Beaucouze (FR)

(72) Inventor: Didier Bessard, Beaucouze (FR)

(73) Assignee: PACK'R, Beaucouze (FR)

( * ) Notice: Subject to any disclaimer, the term of this patent is extended or adjusted under 35 U.S.C. 154(b) by 0 days.

(21) Appl. No.: 17/097,453

(22) Filed: Nov. 13, 2020

(65) Prior Publication Data

US 2021/0147160 A1    May 20, 2021

(30) Foreign Application Priority Data

Nov. 15, 2019 (FR) ........................................ 1912789

(51) Int. Cl.
*B65G 47/86* (2006.01)
*B65B 43/50* (2006.01)

(52) U.S. Cl.
CPC ............ *B65G 47/847* (2013.01); *B65B 43/50* (2013.01); *B65G 2201/0235* (2013.01); *B65G 2207/08* (2013.01)

(58) Field of Classification Search
CPC ................ B65G 47/847; B65G 47/846; B65G 2201/0235; B65G 2207/08
USPC ...................................................... 198/470.1
See application file for complete search history.

(56) References Cited

U.S. PATENT DOCUMENTS

| | | | |
|---|---|---|---|
| 2,805,531 A * | 9/1957 | Dimond | B65B 61/22 53/506 |
| 4,124,112 A | 11/1978 | Mohney et al. | |
| 4,512,456 A * | 4/1985 | Peyton | B65G 47/847 198/470.1 |
| 2015/0091316 A1* | 4/2015 | Fahldieck | B65G 47/847 294/99.1 |
| 2016/0347556 A1* | 12/2016 | Fahldieck | B65G 47/847 |

FOREIGN PATENT DOCUMENTS

| | | | | |
|---|---|---|---|---|
| CN | 102730415 A | * | 10/2012 | ............ B29C 49/78 |
| CN | 105658552 A | * | 6/2016 | ............ B29C 49/36 |
| EP | 3679169 A1 | * | 7/2020 | .......... B65G 47/907 |
| GB | 2406321 A | * | 3/2005 | ............ B65G 29/00 |
| JP | 4596829 B2 | * | 12/2010 | |
| WO | 2005/030616 A2 | | 4/2005 | |
| WO | 2015/082381 A2 | | 6/2015 | |
| WO | WO-2015082381 A2 | * | 6/2015 | ............ B65G 29/00 |

OTHER PUBLICATIONS

Jul. 9, 2020 Search Report issued in French Patent Application No. 1912789.

* cited by examiner

*Primary Examiner* — Gene O Crawford
*Assistant Examiner* — Lester Rushin, III
(74) *Attorney, Agent, or Firm* — Oliff PLC; R. Brian Drozd

(57) ABSTRACT

A star wheel for a rotary packing machine, which includes a vertical shaft, a movable assembly with a frame fixed to said shaft, a plurality of pairs of arms, each arm is hinge mounted on the frame about an axis of rotation, an activation mechanism for each pair of arms, which activation mechanism moves the arms between an open position and a closed position, an adjustment mechanism, which moves the axis of rotation of each arm between two positions, and a locking mechanism, which locks the position of the axis of rotation, and a fixed cam.

8 Claims, 7 Drawing Sheets

[Fig. 1]
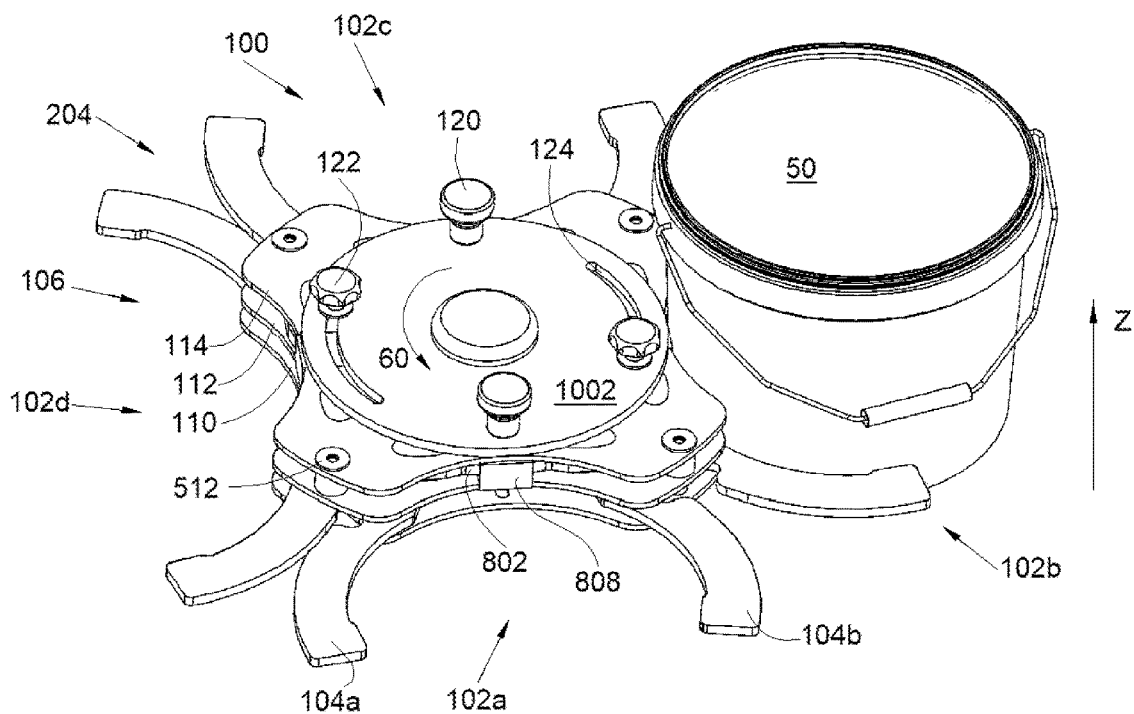
[Fig. 2]
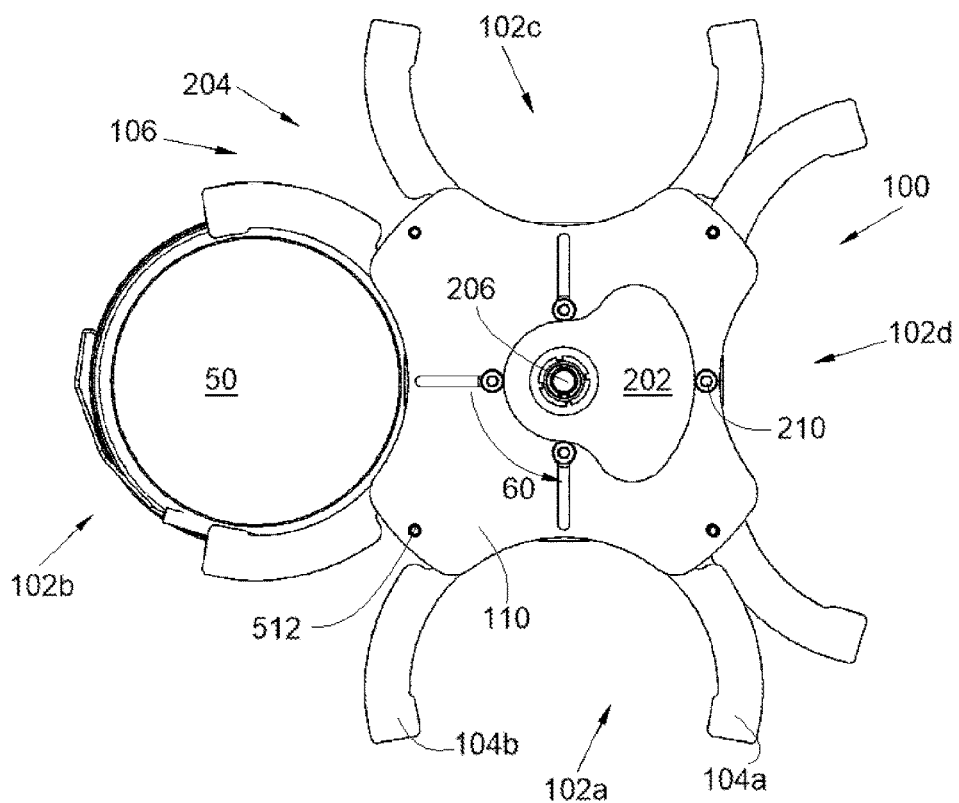

[Fig. 3]
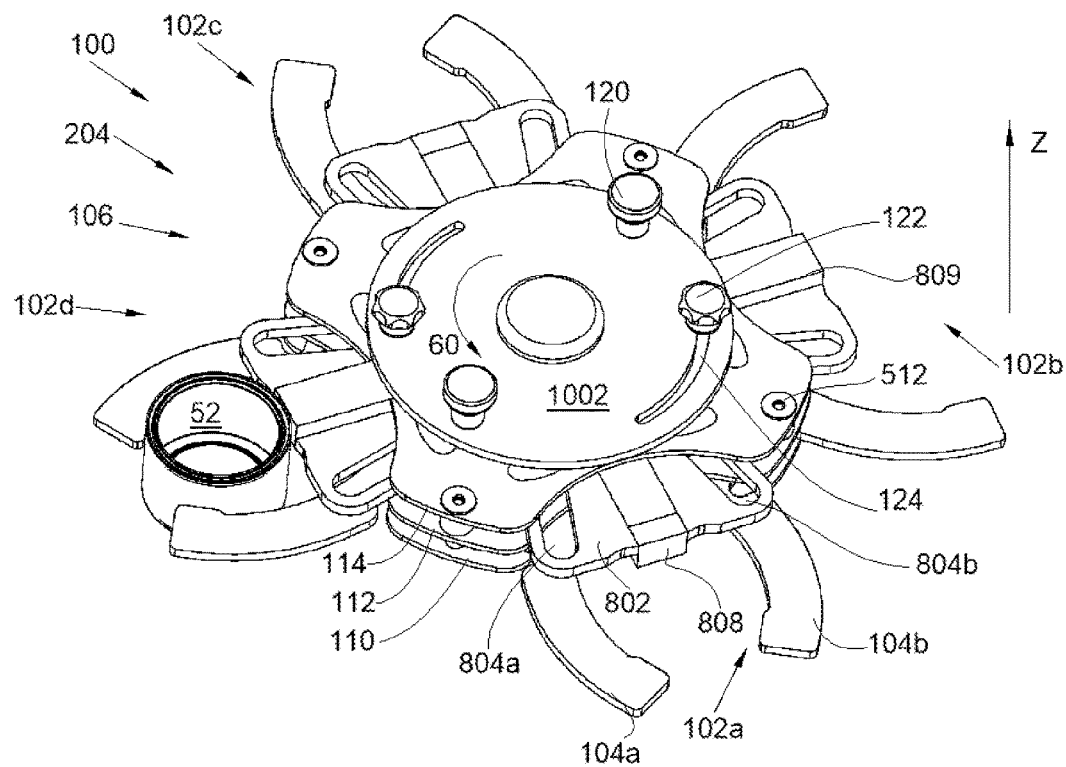
[Fig. 4]
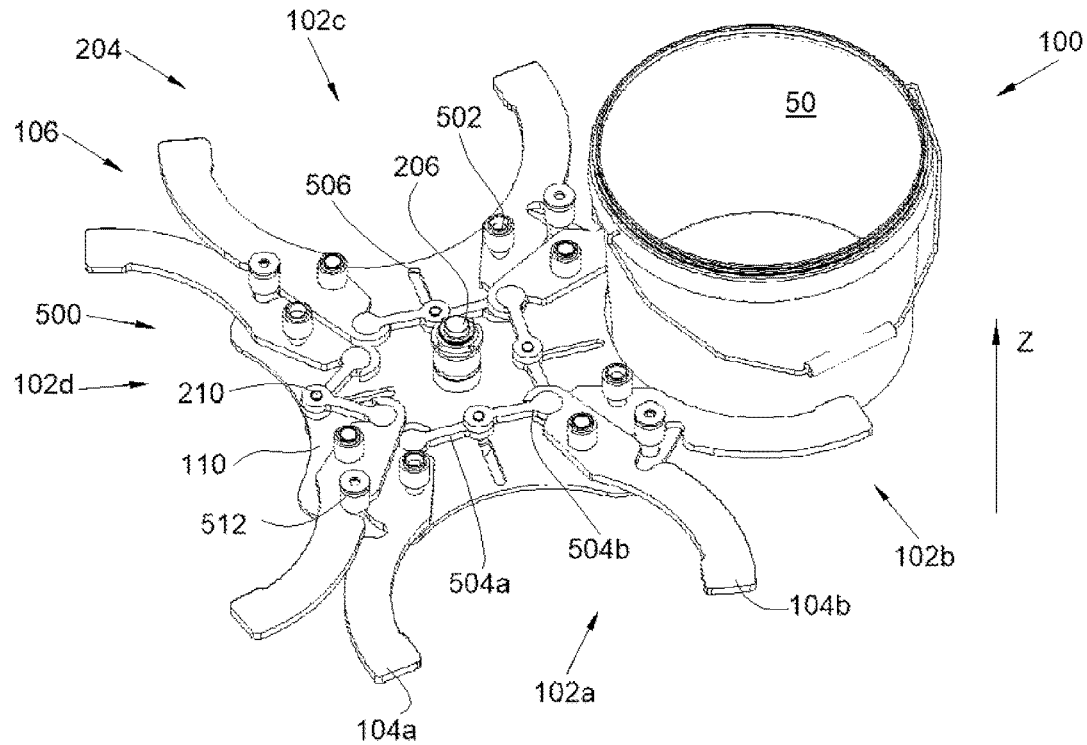

[Fig. 5]
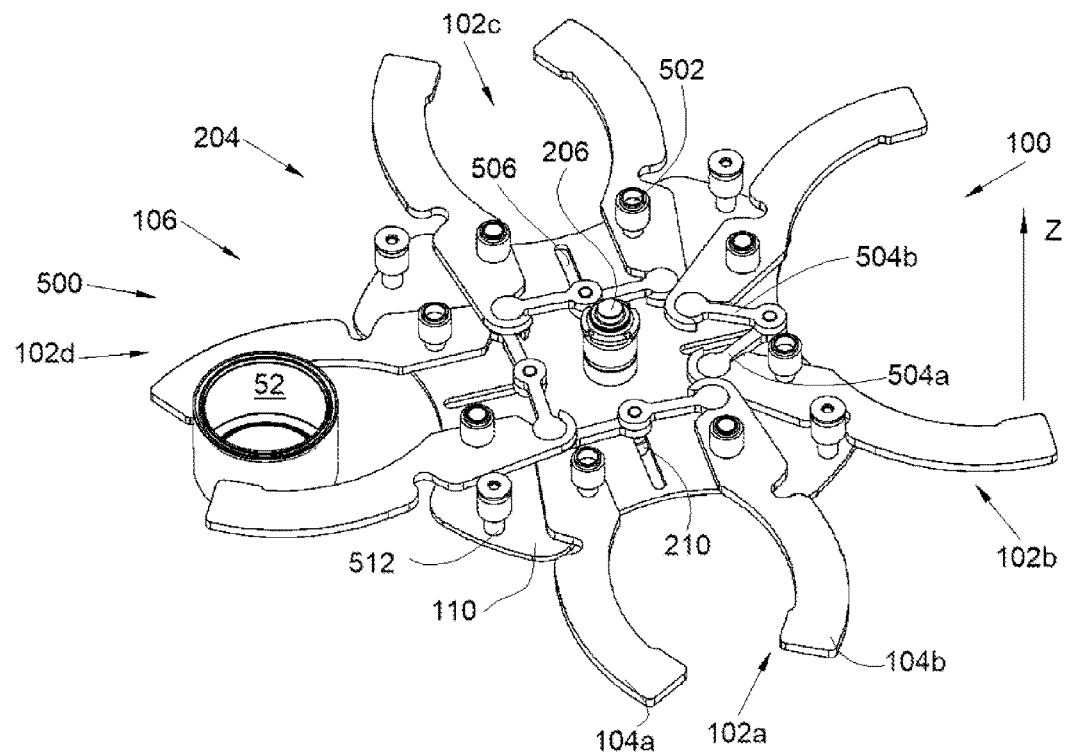
[Fig. 6]
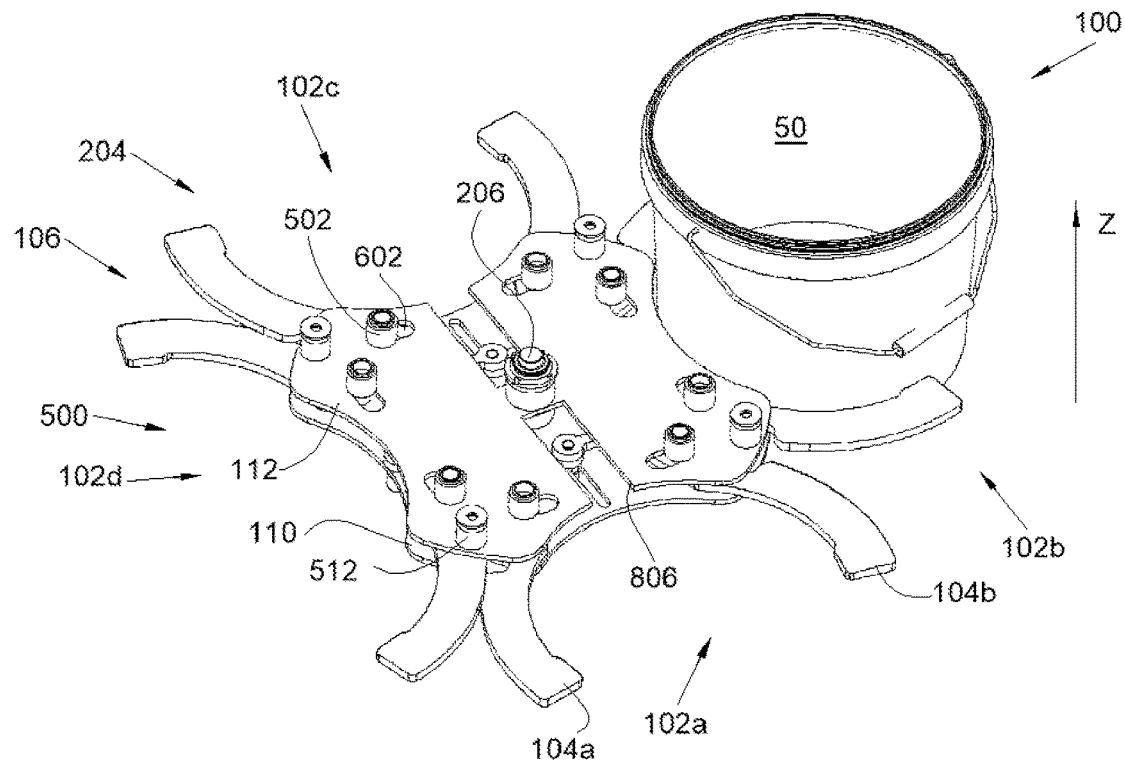

[Fig. 7]
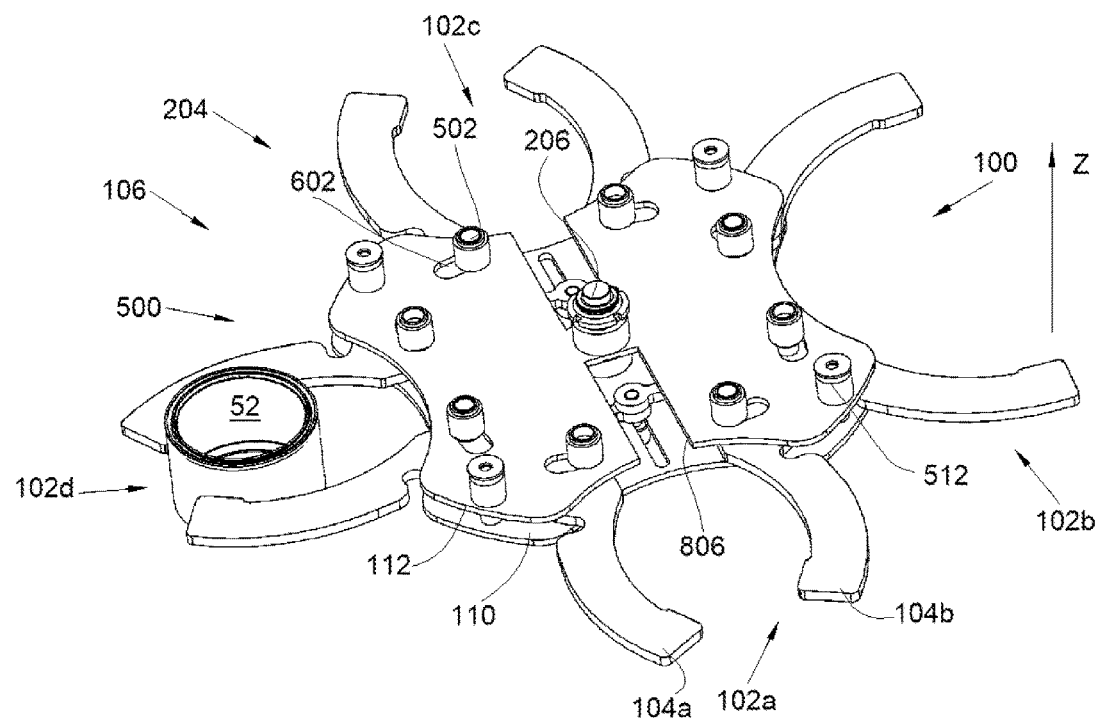
[Fig. 8]
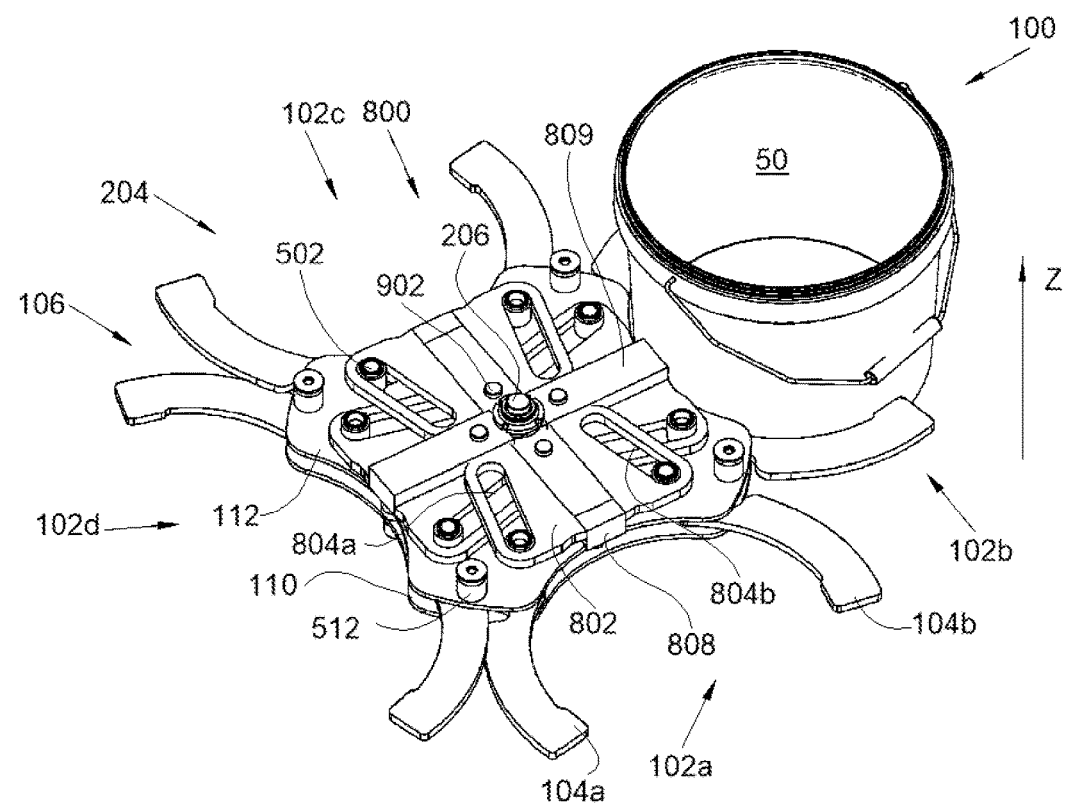

[Fig. 9]
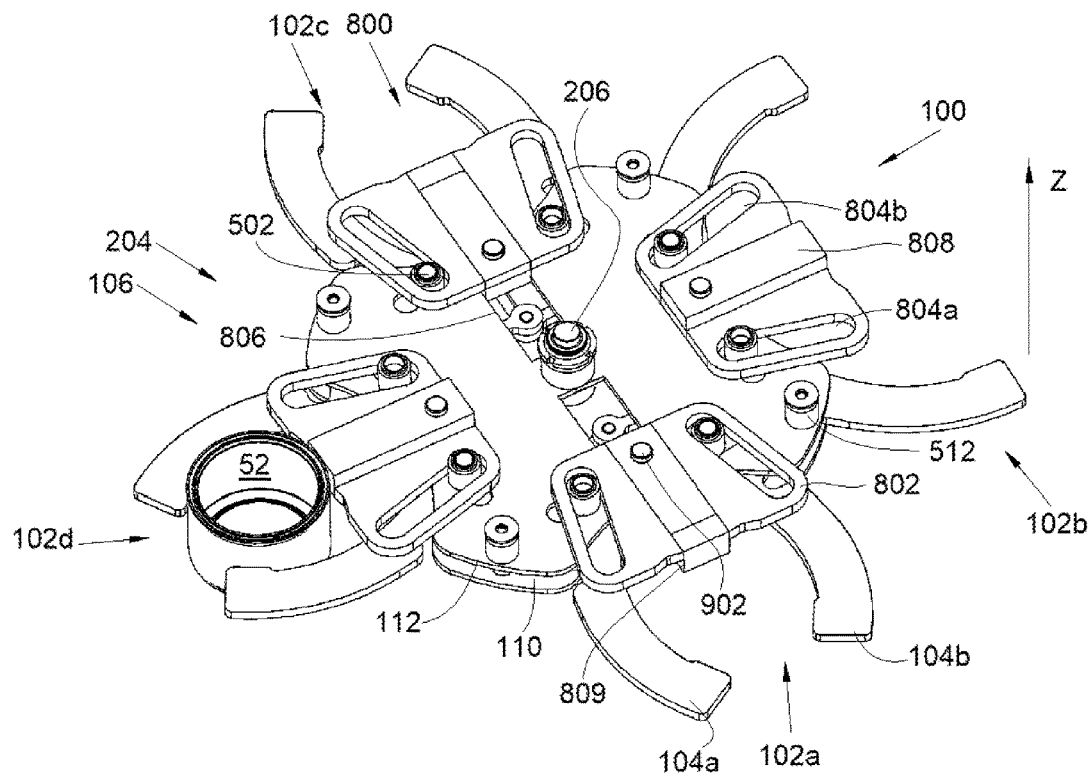
[Fig. 10]
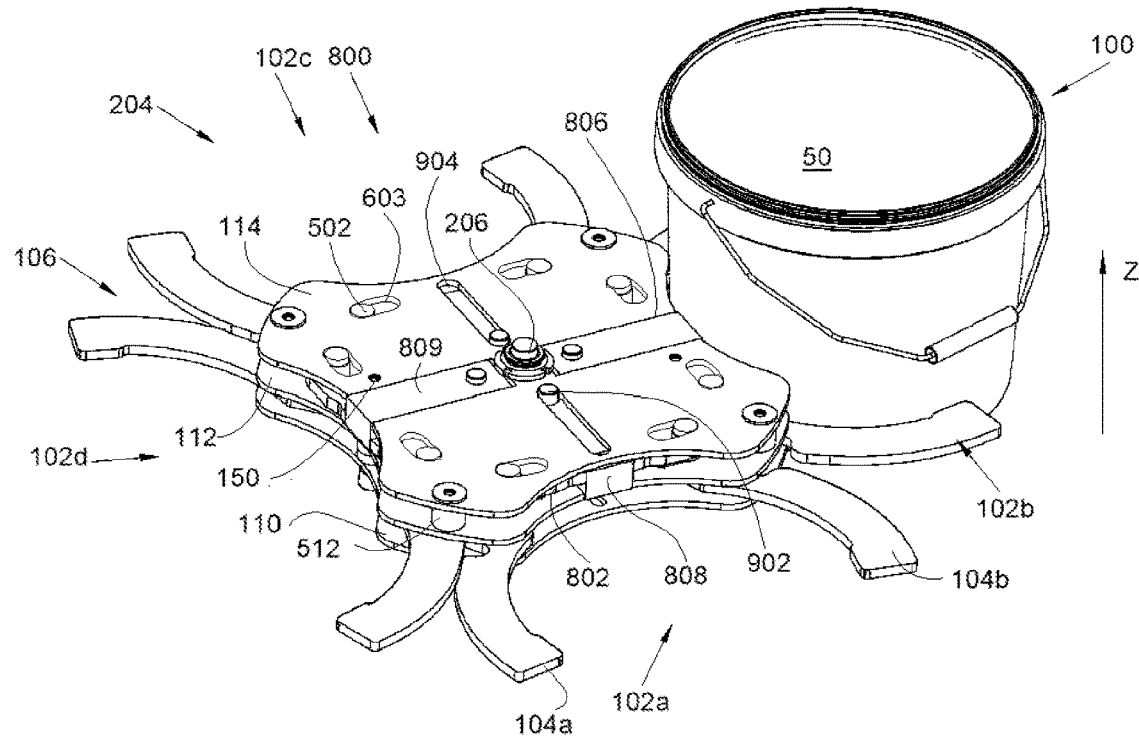

[Fig. 11]
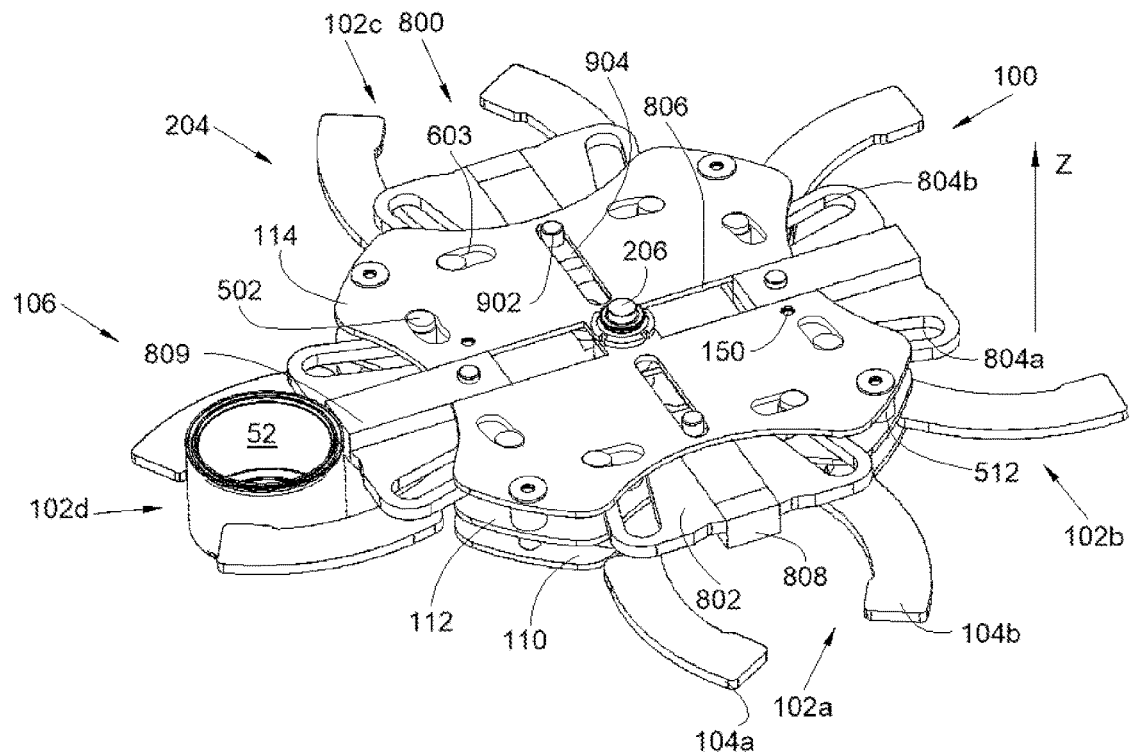
[Fig. 12]
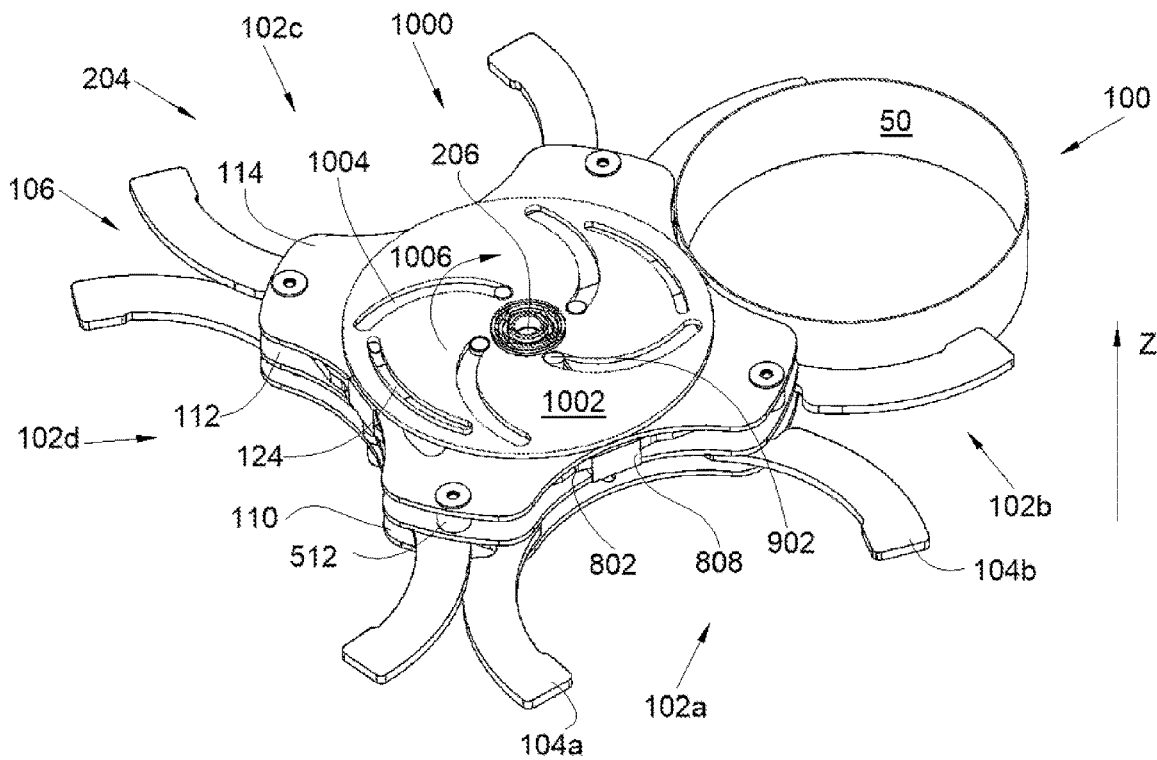

[Fig. 13]
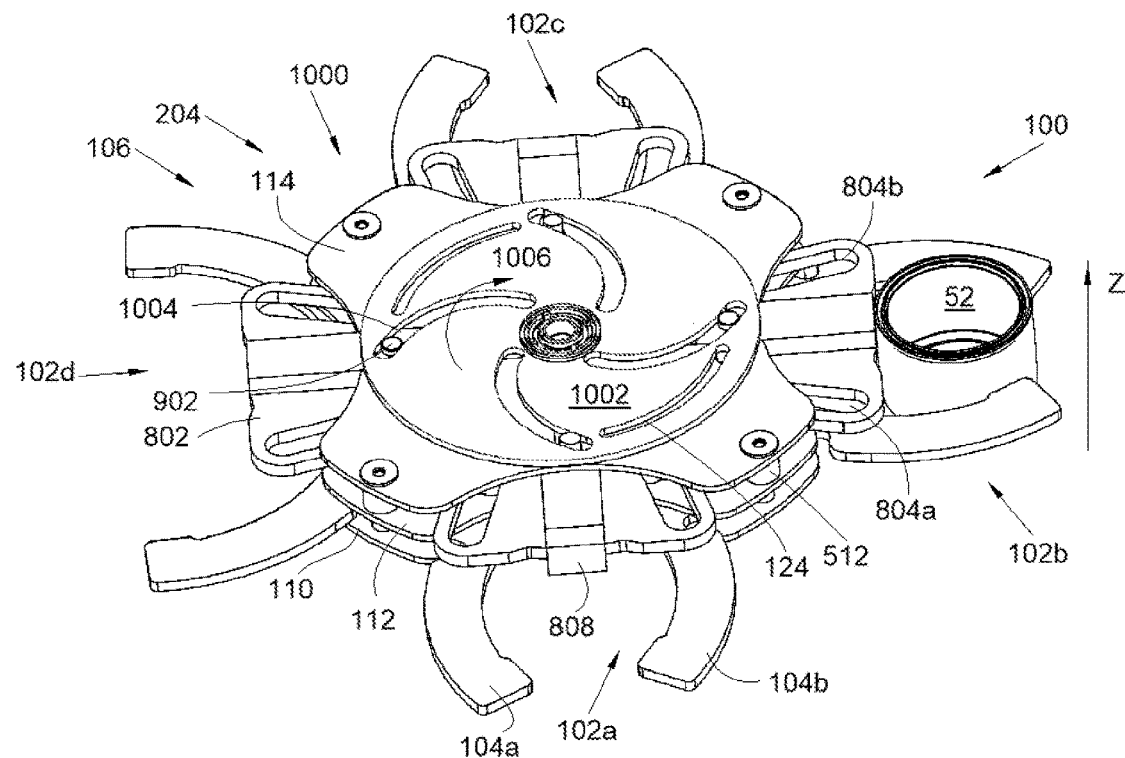
[Fig. 14]
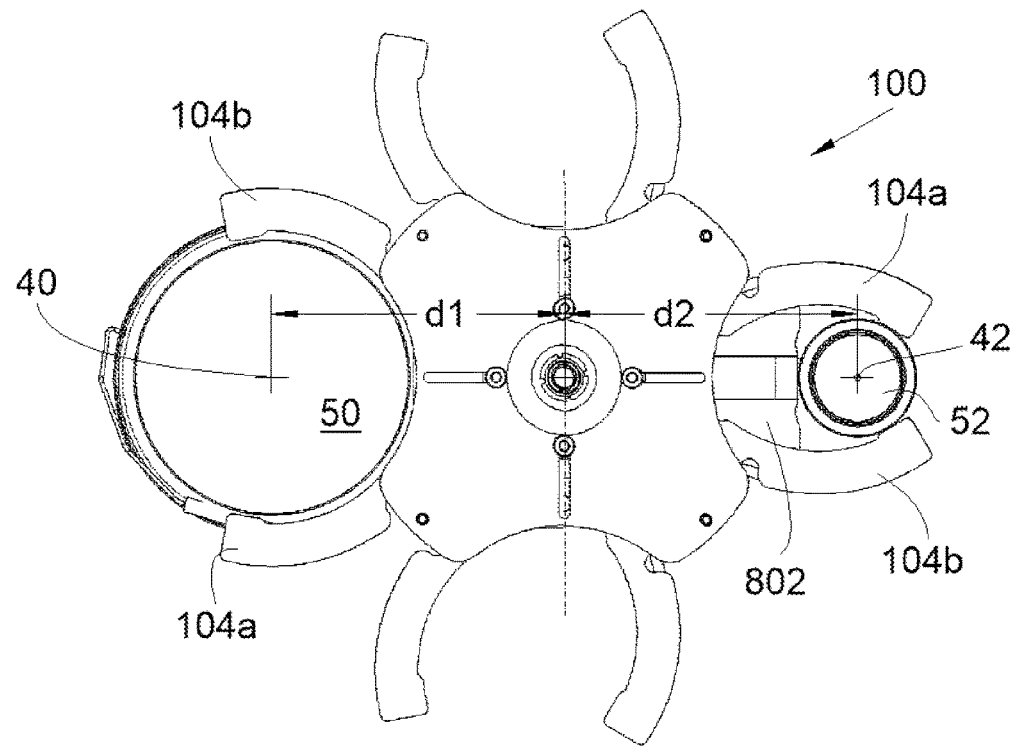

STAR WHEEL FOR A ROTARY PACKING MACHINE

TECHNICAL FIELD

The present invention relates to a star wheel for a rotary packing machine, as well as to a rotary packing machine comprising at least one such star wheel.

PRIOR ART

A rotary packing machine, such as a filling machine of the prior art, is fed with containers to be filled by means of an infeed conveyor belt, on which each container is disposed.

The filling machine comprises a star wheel and a guide. The star wheel is rotated about a vertical axis and comprises indentations, the shape of which is adapted to the shape of the containers and which are evenly distributed around the periphery of the star wheel. Each indentation is intended to receive and to convey a container. The container is kept in the indentation by the guide, which assumes the shape of an arc of a circle concentric with the vertical axis and which is located outside the star wheel in order to press the containers into the bottom of the indentations.

When a filling machine can be used with cylindrical containers with different diameters, the dimensions of each indentation and the position of the guide need to be modified, which is relatively time-consuming work and involves shutting down the filling machine.

A star wheel therefore needs to be found that can quickly adapt to the dimension of the containers.

DISCLOSURE OF THE INVENTION

One aim of the present invention is to propose a star wheel for a rotary packing machine, where the star wheel easily adapts to containers with different diameters and which does not require the use of a guide.

To this end, a star wheel is proposed for a rotary packing machine for containers, the star wheel comprising:
- a shaft that extends vertically about a main axis and that is driven by a rotary movement about said main axis;
- a movable assembly, which comprises:
- a frame fixed to said shaft;
- a plurality of pairs of arms, each comprising two arms, each comprising a distal end and a proximal end and hinge mounted on the frame about a vertical rotation axis, where the arms of each pair of arms can move between an open position and a closed position, and vice versa;
- an activation mechanism for each pair of arms, which activation mechanism has an activation pad that can move between a first limit position and a second limit position, where, in the first limit position, the activation mechanism positions the arms of said pair of arms in an open position and where, in the second limit position, the activation mechanism positions the arms of said pair of arms in a closed position;
- an adjustment mechanism, which moves the vertical rotation axis of each arm between a first position and a second position, and vice versa; and
- a locking mechanism, which locks the position of the vertical rotation axis of each arm between the first position and the second position; and
- a cam, which is fixed relative to the movable assembly and has a guide surface, where the shape of the guide surface is such that each activation pad follows the guide surface in order to successively transition from the first limit position to the second limit position, and vice versa.

Advantageously, the vertical rotation axis of each arm is disposed between the distal end and the proximal end, each activation mechanism comprises a first connecting rod and a second connecting rod, the first end of the first connecting rod is hinge mounted at the proximal end of an arm, the first end of the second connecting rod is hinge mounted at the proximal end of the other arm, and the second end of each connecting rod is hinge mounted on the activation pad.

Advantageously, for each pair of arms, the adjustment mechanism comprises a slide, which is mounted to freely translate radially relative to the main axis between a retracted position and a deployed position, for each vertical rotation axis of the associated pair of arms the slide has a groove, through which the vertical rotation axis passes, the two grooves of the slide form a V, the tip of which is oriented towards the main axis, and the adjustment mechanism comprises a movement system, which moves each slide from the retracted position to the deployed position, and vice versa.

Advantageously, the slide comprises a contact surface, which forms a third contact point on the container.

Advantageously, the movement distance of the contact surface between the retracted position and the deployed position of the slide, as well as the changes of position of the vertical rotation axes of the arms, are such that the position of the barycentre of the two contact points of the arms on the container and of the contact point of the contact surface on the container remains unchanged irrespective of the position of the slide between the retracted position and the deployed position.

Advantageously, each angle defined from a barycentre of the two contact points of the arms on the container and from the contact point of the contact surface on the container, and demarcated between the contact point of the contact surface and one of the contact points of an arm, is greater than 90°.

Advantageously, each slide comprises a drive pad, the movement system comprises a disc mounted to rotate freely about the main axis, for each drive pad, the disc comprises a hole, in which the drive pad is housed, each hole is designed to move the drive pad from a position corresponding to the retracted position of the slide to a position corresponding to the deployed position of the slide when the disc is rotationally moved in one direction and to move the drive pad from the position corresponding to the deployed position of the slide to the position corresponding to the retracted position of the slide when the disc is rotationally moved in an opposite direction.

The invention also proposes a rotary packing machine for containers comprising an infeed conveyor system, an outfeed conveyor system and a star wheel according to one of the preceding alternative embodiments, where the infeed conveyor system conveys the containers to the star wheel and where the outfeed conveyor system takes the containers from the star wheel in order to remove them.

BRIEF DESCRIPTION OF THE DRAWINGS

The aforementioned features of the invention, as well as other features, will become more clearly apparent from reading the following description of an embodiment, with said description being provided with reference to the accompanying drawings, in which:

FIG. 1 is a perspective view of a star wheel according to the invention for a large diameter container;

FIG. 2 is a bottom view of the star wheel of FIG. 1;

FIG. 3 is a perspective view of the star wheel of FIG. 1 for a small diameter container;

FIG. 4 is a perspective view of the star wheel of FIG. 1, some elements of which have been hidden, in the case of a large diameter container;

FIG. 5 is a view similar to that of FIG. 4, for a small diameter container;

FIG. 6 is a perspective view of the star wheel of FIG. 1, some elements of which have been hidden, in the case of a large diameter container;

FIG. 7 is a view similar to that of FIG. 6, for a small diameter container;

FIG. 8 is a perspective view of the star wheel of FIG. 1, some elements of which have been hidden, in the case of a large diameter container;

FIG. 9 is a view similar to that of FIG. 8, for a small diameter container;

FIG. 10 is a perspective view of the star wheel of FIG. 1, some elements of which have been hidden, in the case of a large diameter container;

FIG. 11 is a view similar to that of FIG. 10, for a small diameter container;

FIG. 12 is a perspective view of the star wheel of FIG. 1, some elements of which have been hidden, in the case of a large diameter container;

FIG. 13 is a view similar to that of FIG. 12, for a small diameter container; and FIG. 14 is a bottom view of the star wheel according to the invention.

DETAILED DISCLOSURE OF EMBODIMENTS

In the following description, the directions are taken with reference to the normal operation of a rotary packing machine, and in particular, the vertical direction oriented upwards, as shown by the arrow Z.

FIG. 1 shows a star wheel 100 of a rotary packing machine, such as a filling machine, that allows cylindrical containers with different diameters to be filled. The various Figures show either a large diameter container 50 or a small diameter container 52. The invention will be more specifically described for a rotary filling machine, but it is equally applicable to all rotary packing machines, such as, for example, a filling machine, a labelling machine, or a sealing machine, etc.

Like the filling machine of the prior art, the filling machine according to the invention comprises an infeed conveyor system, such as a belt, that conveys the containers 50, 52 to the star wheel 100 and an outfeed conveyor system, such as a belt, that takes the containers 50, 52 from the star wheel 100 in order to remove them. A conveyor system is any system that allows a container to be handled and can be, for example, a belt conveyor, a carousel, etc. FIG. 2 shows the star wheel 100 as a bottom view. The star wheel 100 comprises a cam 202, which is fixed, and a movable assembly 204, which is driven by a rotary movement 60 about a main vertical axis. The cam 202 is fixed relative to the movable assembly 204 and it is fixed, for example, to an element of the filling machine. The cam 202 has a guide surface, which in this case is the vertical surface forming the edge of the cam 202.

The star wheel 100 comprises a shaft 206, which extends vertically and the axis of which is coaxial with the main axis. The shaft 206 is rotated about the main axis by any suitable means, such as, for example, a motor. Thus, the shaft 206 extends vertically about the main axis and is driven by a rotary movement about said main axis.

The movable assembly 204 comprises a frame 106 that is fixed to the shaft 206 and that is therefore rotated (60) thereby about the main axis.

The movable assembly 204 also comprises a plurality of pairs of arms 102a-d (in this case 4 arms), each comprising two arms 104a-b, each comprising a distal end and a proximal end. Each arm 104a-b is hinge mounted on the frame 106 about a vertical rotation axis (502, FIG. 5). The arms 104a-b of each pair of arms 102a-d can move between an open position and a closed position, and vice versa. In the open position, the distal ends are separated to allow through the container 50, 52, and in the closed position, the distal ends are tightened to come into abutment against the container 50, 52 and clamp it.

As will be explained hereafter, for each pair of arms 102a-d, the movable assembly 204 comprises an activation mechanism (500, FIG. 5) with an activation pad 210 that can move between a first limit position and a second limit position, where, in the first limit position, the activation mechanism 500 positions the arms 104a-b of said pair of arms 102a-d in an open position and where, in the second limit position, the activation mechanism 500 positions the arms 104a-b of said pair of arms 102a-d in a closed position. In this case, the movement of each activation pad 210 is a radial translation movement relative to the main axis.

Each activation pad 210 is urged into abutment against the guide surface of the cam 202 and, when the movable assembly 204 rotates, each activation pad 210 is successively moved by the cam 202 from the first limit position to the second position, and vice versa, and this movement causes the activation mechanism 500 to activate, which moves the arms 104a-b, which then successively transition from the open position to the closed position, then again to the open position.

The shape of the cam 202, and more specifically of its guide surface, is such that each activation pad 210 follows the guide surface in order to successively transition from the first limit position to the second limit position, and vice versa.

Thus, when the movable assembly 204 rotates, a container 50, 52 is conveyed by the infeed conveyor system on a pair of arms 102a-d, the arms 104a-b of which are in an open position, the arms 104a-b then progressively transition to the closed position when the movable assembly 204 rotates, in order to clamp the container 50, 52, the movable assembly 204 then rotates with the container 50, 52 that is thus clamped, then the arms 104a-b progressively transition to the open position in order to release the container 50, 52 on the outfeed conveyor system.

The activation mechanism 500 allows a container 50, 52 to be clamped, but due to their layout, the clamping of the arms 104a-b is limited to containers 50, 52 that have a diameter that is within a limited interval.

In order to allow the star wheel 100 to be used for a wider range of containers 50, 52, the position of the arms 104a-b needs to be modified, in particular, the vertical rotation axes 502 of the two arms 104a-b of a pair 102a-d need to be moved by moving them apart or bringing them together. Thus, by moving apart the vertical rotation axes 502, the arms 104a-b can clamp containers 50, 52 with a larger diameter, and by bringing together the vertical rotation axes 502, the arms 104a-b can clamp containers 50, 52 with a smaller diameter.

In order to allow the star wheel 100 to be adapted, and more particularly the clearance between the two arms 104a-b of a pair of arms 102a-d, the movable assembly 204 also comprises an adjustment mechanism (800, FIG. 8), which moves the vertical rotation axis 502 of each arm 104a-b between a first position and a second position, and vice versa, where the first position corresponds to a clearance that allows a large diameter container 50 to be gripped and where the second position corresponds to a clearance that allows a small diameter container 52 to be gripped. Indeed, by moving the axis of rotation of each arm 104a-b, the clearance between the distal ends is modified. In the first position, the vertical rotation axes 502 of the two arms 104a-b of the pair 102a-d are spaced apart from each other and, in the second position, the vertical rotation axes 502 of the two arms 104a-b of the pair 102a-d are brought together.

In order to block the position of each vertical rotation axis 502, the movable assembly 204 also comprises a locking mechanism, which locks the position of the vertical rotation axis 502 of each arm 104a-b between the first position and the second position.

FIG. 3 shows the star wheel 100 in the case of a small diameter container 52, where the clearance between the arms 104a-b has been reduced.

The frame 106 comprises, from the bottom to the top, i.e. from the cam 202, a lower plate 110, an intermediate plate 112 and an upper plate 114. Each plate 110, 112, 114 is fixed to the shaft 206. In the embodiment of the invention shown herein, the plates are fixed together by spacers 512, but other fixing modes are possible.

FIG. 4 and FIG. 5 show the activation mechanism 500 of each pair of arms 102a-d, respectively, for a large diameter container 50 and for a small diameter container 52. Each activation mechanism 500 is installed between the lower plate 110 and the intermediate plate 112.

In the embodiment of the invention shown herein, the vertical rotation axis 502 of each arm 104a-b is disposed between the distal end and the proximal end. In this case, each vertical rotation axis 502 is freely mounted on the intermediate plate 112, as is more clearly shown in FIGS. 6 and 7.

For each pair of arms 102a-d, the activation mechanism 500 comprises a first connecting rod 504a and a second connecting rod 504b. The first end of the first connecting rod 504a is hinge mounted at the proximal end of an arm 104a, and the first end of the second connecting rod 504b is hinged mounted at the proximal end of the other arm 104b. The second end of each connecting rod 504a-b is hinge mounted on the activation pad 210. Each of the articulations in this case assumes the form of a rotation about a vertical axis.

The activation pad 210 is radially guided by a slot 506, which passes through the lower plate 110. The slot 506 in this case is equidistantly disposed between the vertical rotation axes 502 of the two arms 104a-b.

Depending on the position of the movable assembly 204 relative to the cam 202, the position of the activation pad 210 will result in a different position of the connecting rods 504a-b and therefore a different position of the arms 104a-b. In this case, separating the activation pad 210 from the main axis will separate the arms 104a-b and bringing together the activation pad 210 with the main axis will tighten the arms 104a-b.

FIG. 6 and FIG. 7 show the installation of the vertical rotation axes 502 relative to the intermediate plate 112. For each vertical rotation axis 502, the intermediate plate 112 has an opening 602, the dimensions of which are greater than the diameter of the vertical rotation axis 502 that passes therethrough in order to allow the vertical rotation axis 502 to move relative to the opening 602. The opening 602 in this case assumes the shape of an oblong hole forming an arched recess, the position and the orientation of which depend, among other things, on the dimensions of the arms 104a-b, and for which the angular span depends on the span of the range of diameters to be covered for the containers 50, 52.

As can be seen in FIG. 6, for a large diameter container 50, all the vertical rotation axes 504 are disposed against one of the sides of the opening 602 and, in FIG. 7, for a small diameter container 52, all the vertical rotation axes 504 are disposed against the other side of the opening 602.

As is more clearly shown in FIGS. 10 and 11, the upper plate 114 also has openings 603 that are identical to the openings 602 of the intermediate plate 112 for installing the vertical rotation axes 502.

FIG. 8 and FIG. 9 show the adjustment mechanism 800, which is arranged between the intermediate plate 112 and the upper plate 114.

For each pair of arms 102a-d, the adjustment mechanism 800 comprises a slide 802, which is mounted to freely translate radially relative to the main axis, and each slide 802 thus can move between a retracted position (FIG. 8) corresponding to a large diameter container 50 and a deployed position (FIG. 9) corresponding to a small diameter container 52.

For each vertical rotation axis 502 of a pair of arms 102a-d, the associated slide 802 has a groove 804a-b, through which the vertical rotation axis 502 passes. Each groove 804a-b forms a guide for the vertical rotation axis 502.

The two grooves 804a-b of a slide 802 form a V in a plane perpendicular to the main axis, the tip of which V is oriented towards the main axis. The distance between the ends of the two grooves 804a-b is thus smaller on the side of the main axis and larger on the outside.

Thus, in the retracted position, the vertical rotation axes 504 are positioned at the furthest apart ends (on the outside) and are therefore spaced apart from each other to allow a large diameter container 50 to be gripped.

Whereas in the deployed position, the vertical rotation axes 504 are positioned at the closest ends (on the inside) and are therefore brought together to allow a small diameter container 52 to be gripped.

The grooves 804a-b are symmetrically disposed relative to a vertical plane of symmetry between the two arms 104a-b.

For the set of slides 802, the adjustment mechanism 800 comprises a movement system (1000, FIG. 12), which moves each slide 802 from the retracted position to the deployed position, and vice versa.

The translation movement of each slide 802 is provided by a guide groove 806 that extends radially and, in this case, is produced in the intermediate plate 112 for two slides 802 and in the upper plate 114 for the other two slides 802. Of course, it is also possible for all the guide grooves 806 to be produced in the intermediate plate 112 or in the upper plate 114.

Each slide 802 has a rectangular prism 809, which engages with the associated guide groove 806 in order to translationally move the slide 802.

FIG. 10 and FIG. 11 show the star wheel 100 with the upper plate 114.

Each slide 802 has a drive pad 902, which engages with the movement system 1000 in order to move said slide 802.

In the configuration shown in FIGS. 10 and 11, the upper plate 114 has radial grooves 904 to allow through the drive pads 902 of the slides 802 guided by the intermediate plate 112.

FIG. 12 and FIG. 13 show the movement system 1000, which comprises a disc 1002, which in this case is shown as a cross-section through a plane perpendicular to the main axis.

The disc 1002 is mounted to rotate freely about the main axis.

For each drive pad 902, the disc 1002 comprises a hole 1004 assuming the shape of an arc of a disc and in which the drive pad 902 is housed. The hole 1004 has a first end, which corresponds to the position of the drive pad 902 in the retracted position (FIG. 12), and a second end, which corresponds to the position of the drive pad 902 in the deployed position (FIG. 13). The first end is in the vicinity of the centre of the disc 1002, i.e. in the vicinity of the main axis and the second position is in the vicinity of the outer periphery of the disc 1002.

Each hole 1004 is thus designed to move the drive pad 902 from a position corresponding to the retracted position of the slide 802 to a position corresponding to the deployed position of the slide 802, when the disc 1002 is rotationally moved in one direction (1006), and to move the drive pad 902 from the position corresponding to the deployed position of the slide 802 to the position corresponding to the retracted position of the slide 802 when the disc 1002 is rotationally moved in an opposite direction (opposite 1006).

In order to facilitate handling of the disc 1002, said disc comprises handles 120.

In the embodiment of the invention shown herein, the locking mechanism assumes the form of two clamping knobs 122, with a threaded rod that screws into the upper plate 114 through a recess 124 of the disc 1002. To this end, the upper plate 114 has a tapped hole 150 for each clamping knob 122.

From the position of FIG. 12, a rotation of the disc 1002 in the direction of the arrow 1106 will cause each hole 1004 to move and, as each drive pad 902 is urged to translationally move, it will move along the hole 1004 in order to reach the second end, thus ensuring that each slide 802 transitions from the retracted position (FIG. 12) to the deployed position (FIG. 13) and thus allowing the separation of the arms 104a-b to be adjusted.

Each activation pad 210 can be held against the guide surface of the cam 202 by a return element, for example, such as a spring, or a leaf spring that presses or pulls the activation pad 210. According to another embodiment, provision also can be made for the activation pad 210 to follow a groove formed in the cam 202.

FIG. 14 is an image produced by an assembly between a star wheel 100 adjusted for a large diameter container 50 on the left-hand side and a star wheel 100 adjusted for a small diameter container 52 on the right-hand side.

Each container 50, 52 is engaged between the distal ends of the arms 104a-b and the slide 802 that is in the retracted position on the left-hand side and in the deployed position on the right-hand side.

The slide 802 comprises a contact surface 808, which forms a third contact point on the container 50, 52, and the other two contact points are the contact points between the container 50, 52 and the arms 104a-b.

The contact surface 808 is disposed on the end of the slide 802 that is perpendicular to the radial direction relative to the main axis and that is located between the two arms 104a-b.

When the slide 802 is in the deployed position, the contact surface 808 exits the frame 106 in order to come into abutment against the surface of the small diameter container 52.

The distance for moving the contact surface 808 between the retracted position and the deployed position of the slide 802, as well as the changes of position of the vertical rotation axes 502 of the arms 104a-b, are such that the position of the barycentre of the two contact points of the arms 104a-b on the container 50, 52, and of the contact point of the contact surface 808 on the container 50, 52, remain unchanged between a large diameter container 50 and a small diameter container 52, i.e. irrespective of the position of the slide 802 between the retracted position and the deployed position. This barycentre is aligned with the vertical axis of the container 50, 52.

The movement law of the contact surface 808 and the movement law of the vertical rotation axes 502 of the arms 104a-b depend on the dimensions of the various elements forming the star wheel 100 and on the limit diameters of the containers that are used. This law can be determined by geometric constructions and computations.

The first reference 40 represents the centre of the large diameter container 50 and the barycentre of the three contact points of the arms 104a-b and of the slide 802 on this container.

The second reference 42 represents the centre of the small diameter container 52 and the barycentre of the three contact points of the arms 104a-b and of the slide 802 on this container.

The horizontal distance d1 between the main axis and the first reference 40 is equal to the horizontal distance d2 between the main axis and the second reference 42.

Thus, the position of the axis of the container 50, 52 always remains in the same position and the filling system that fills the container does not need to be moved.

In order to ensure that the container 50, 52 has good support against the star wheel 100, and more specifically against the contact surface 808, the contact points of the arms 104a-b and of the contact surface 808 on the container 50, 52 are disposed so that, in a horizontal plane perpendicular to the main axis, each angle defined from the barycentre 40, 42 of the two contact points of the arms 104a-b on the container 50, 52 and from the contact point of the contact surface 808 on the container 50, 52, and demarcated between the contact point of the contact surface 808 and one of the contact points of an arm 104a-b, is greater than 90°. Thus, each contact point of the arms 104a-b passes beyond the centre of the container 50, 52 relative to the contact point of the contact surface 808.

The invention claimed is:

1. A star wheel for a rotary packing machine for containers, the star wheel comprising:
a shaft that extends vertically about a main axis and that is driven by a rotary movement about said main axis;
a movable assembly, which comprises:
a frame fixed to said shaft;
a plurality of pairs of arms, each comprising two arms, each comprising a distal end and a proximal end and hinge mounted on the frame about a vertical rotation axis, where the arms of each pair of arms can move between an open position and a closed position, and vice versa;
an activation mechanism for each pair of arms, which activation mechanism has an activation pad that can move between a first limit position and a second limit position, where, in the first limit position, the activation mechanism positions the arms of said pair of arms in an open position and where, in the second limit position, the activation mechanism positions the arms of said pair of arms in a closed position;

an adjustment mechanism, which moves the vertical rotation axis of each arm (104a-b) between a first position and a second position, and vice versa; and a locking mechanism, which locks the position of the vertical rotation axis of each arm between the first position and the second position; and a cam, which is fixed relative to the movable assembly and has a guide surface, where the shape of the guide surface is such that each activation pad follows the guide surface in order to successively transition from the first limit position to the second limit position, and vice versa.

2. The star wheel according to claim 1, wherein the vertical rotation axis of each arm is disposed between the distal end and the proximal end, wherein each activation mechanism comprises a first connecting rod and a second connecting rod, wherein the first end of the first connecting rod is hinge mounted at the proximal end of an arm, wherein the first end of the second connecting rod is hinge mounted at the proximal end of the other arm, and wherein the second end of each connecting rod is hinge mounted on the activation pad.

3. The star wheel according to claim 1, wherein, for each pair of arms, the adjustment mechanism comprises a slide, which is mounted to freely translate radially relative to the main axis between a retracted position and a deployed position, wherein, for each vertical rotation axis of the associated pair of arms, the slide has a groove, through which the vertical rotation axis passes, wherein two grooves of the slide form a V, the tip of which is oriented towards the main axis, and wherein the adjustment mechanism comprises a movement system, which moves each slide from the retracted position to the deployed position, and vice versa.

4. The star wheel according to claim 3, wherein the slide comprises a contact surface, which forms a contact point on the container.

5. The star wheel according to claim 4, wherein the movement distance of the contact surface between the retracted position and the deployed position of the slide, as well as the changes of position of the vertical rotation axes of the arms, are such that the position of the barycentre of the two contact points of the arms (104a-b) on the container, and of the contact point of the contact surface on the container, remains unchanged irrespective of the position of the slide between the retracted position and the deployed position.

6. The star wheel according to claim 4, wherein each angle defined from a barycentre of the two contact points of the arms on the container and from the contact point of the contact surface on the container, and demarcated between the contact point of the contact surface and one of the contact points of an arm, is greater than 90°.

7. The star wheel according to claim 3, wherein each slide comprises a drive pad, wherein the movement system comprises a disc mounted to rotate freely about the main axis, wherein, for each drive pad, the disc comprises a hole, in which the drive pad is housed, wherein each hole is designed to move the drive pad from a position corresponding to the retracted position of the slide to a position corresponding to the deployed position of the slide when the disc is rotationally moved in one direction, and to move the drive pad from the position corresponding to the deployed position of the slide to the position corresponding to the retracted position of the slide when the disc is rotationally moved in an opposite direction.

8. The rotary packing machine for containers comprising an infeed conveyor system, an outfeed conveyor system and a star wheel according to claim 1, where the infeed conveyor system conveys the containers to the star wheel and where the outfeed conveyor system takes the containers from the star wheel in order to remove them.

* * * * *